(12) United States Patent
Muraoka et al.

(10) Patent No.: US 9,002,289 B2
(45) Date of Patent: Apr. 7, 2015

(54) WIRELESS COMMUNICATION APPARATUS, WIRELESS COMMUNICATION SYSTEM, INTERFERENCE CAUSING CONTROL METHOD, STORAGE MEDIUM AND CONTROL APPARATUS

(75) Inventors: Kazushi Muraoka, Tokyo (JP); Hiroto Sugahara, Tokyo (JP); Masayuki Ariyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 122 days.

(21) Appl. No.: 13/581,992

(22) PCT Filed: Feb. 15, 2011

(86) PCT No.: PCT/JP2011/053612
§ 371 (c)(1),
(2), (4) Date: Aug. 30, 2012

(87) PCT Pub. No.: WO2011/108380
PCT Pub. Date: Sep. 9, 2011

(65) Prior Publication Data
US 2012/0322390 A1   Dec. 20, 2012

(30) Foreign Application Priority Data

Mar. 1, 2010   (JP) .................. 2010-044349

(51) Int. Cl.
*H04B 17/00* (2006.01)
*H04W 16/14* (2009.01)
*H04W 52/24* (2009.01)
*H04B 1/10* (2006.01)

(52) U.S. Cl.
CPC ........... *H04W 16/14* (2013.01); *H04B 17/0042* (2013.01); *H04B 17/009* (2013.01); *H04W 52/243* (2013.01); *H04B 17/005* (2013.01); *H04B 17/0057* (2013.01)

(58) Field of Classification Search
USPC ................. 455/63.1–63.2, 67.11, 67.13, 454
See application file for complete search history.

(56) References Cited

U.S. PATENT DOCUMENTS

RE43,066 E  *  1/2012  McHenry ...................... 455/454
2010/0048236 A1   2/2010  Higuchi et al.
(Continued)

FOREIGN PATENT DOCUMENTS

| CN | 101218763 A | 7/2008 |
| JP | 2007-28568 A | 2/2007 |

(Continued)

OTHER PUBLICATIONS

Communication dated Jun. 27, 2014, issued by the State Intellectual Property Office of the People's Republic of China, in counterpart Application No. 201180012127.X.

(Continued)

*Primary Examiner* — Lee Nguyen
(74) *Attorney, Agent, or Firm* — Sughrue Mion, PLLC

(57) ABSTRACT

[Problem] To provide a wireless communication apparatus, a wireless communication system, an interference causing control method, a storage medium, and a control apparatus which can carry out appropriate interference causing control to a secondary system adaptively to an actual environment with no change in a configuration of a primary system.

[Means to solve the problem] A wireless communication apparatus, which belongs to a wireless communication system, measures a wireless signal which causes interference to another system and which another wireless communication apparatus belonging to the wireless communication system transmits.

21 Claims, 12 Drawing Sheets

(56) References Cited

U.S. PATENT DOCUMENTS

2012/0329403 A1* 12/2012 Muraoka et al. ............ 455/67.13
2014/0018008 A1* 1/2014 Tang .......................... 455/67.11

FOREIGN PATENT DOCUMENTS

| JP | 2009-21784 A | 1/2009 |
|---|---|---|
| JP | 2009-109241 A | 5/2009 |
| JP | 2009-212920 A | 9/2009 |
| JP | 5466404 B2 | 4/2014 |
| WO | 2008/053553 A1 | 5/2008 |

OTHER PUBLICATIONS

Communication dated Nov. 25, 2014, issued by the Japanese Patent Office in counterpart Japanese application No. 2012-503068.

* cited by examiner

WIRELESS COMMUNICATION APPARATUS, WIRELESS COMMUNICATION SYSTEM, INTERFERENCE CAUSING CONTROL METHOD, STORAGE MEDIUM AND CONTROL APPARATUS

CROSS REFERENCE TO RELATED APPLICATIONS

This application is a National Stage of International Application No. PCT/JP2011/053612 filed on Feb. 15, 2011, which claims priority from Japanese Patent Application No. 2010-044349, filed on Mar. 1, 2010, the contents of all of which are incorporated herein by reference in their entirety.

TECHNICAL FIELD

The present invention relates to a wireless communication apparatus, a wireless communication system, an interference causing control method, a storage medium and a control apparatus.

BACKGROUND ART

The cognitive wireless to recognize a surrounding wireless environment and to optimize a communication parameter on the basis of the wireless environment is well known. As an example of the cognitive wireless, a case that a secondary system (interference causing system) shares a frequency bandwidth which is assigned originally to a primary system (interference receiving system) is exemplified.

For example, it is discussed in IEEE 802.22 Draft Ver 2.0 to standardize a WRAN system which is corresponding to the secondary system and which shares a frequency bandwidth (TV channel) assigned originally to a TV broadcasting system corresponding to the primary system. Here, IEEE is an abbreviation of Institute of Electrical and Electronic Engineers. Moreover, WRAN is an abbreviation of Wireless Regional Area Network.

When the secondary system shares the frequency bandwidth with the primary system, it is necessary that the secondary system does not cause any influence on an existing service which the primary system provides. In order to avoid interference to the primary system, the secondary system must use a frequency bandwidth which the primary system does not use temporally and spatially or the secondary system must communicate with making an amount of the interference not larger than a permissible amount of the interference in the primary system.

For example, a service area of the TV broadcasting system, which is corresponding to the primary system, is defined as an area whose receiving radio wave intensity is not smaller than a predetermined level (for example, not smaller than 60 dBμV/m). Then, it is necessary that the secondary system (for example, the above-mentioned WRAN system) suppresses the interference so that a receiver, which exists in the service area, may maintain predetermined SIR (for example, 23 dB). Here, SIR is an abbreviation of Signal to Interference power Ratio.

As an example of an art to suppress the interference which the secondary system causes to the primary system, an art disclosed in a non-patent document 1 is exemplified. The non-patent document 1 describes a method to identify the service area of the TV system by use of a TV database, and to determine transmit power by use of propagation loss, which is estimated on the basis of a propagation model, so that interference power at an edge of the service area may be permissible.

Moreover, a non-patent document 2 describes a wireless communication system shown in the following. According to the wireless communication system, the primary system detects the interference through measuring a decline of throughput, and issues an interference alert to the secondary system in the case of detecting the interference. Then, the secondary system stops using the frequency which the secondary system shares with the primary system.

Moreover, a patent document 1 describes an art shown in the following. According to the art, one wireless apparatus estimates propagation characteristic of a signal (estimate an attenuation coefficient due to a distance), which is transmitted by a transmitter of another system, by use of received interference power (corresponding to received power of the primary signal) from another system. Then, the wireless apparatus identifies an edge of an area whose received power is not smaller than a desired value, and makes its own transmit power increasing so that the received power may become very close to a permissible value at the edge of the area.

PRECEDING TECHNICAL DOCUMENT

Patent Document

[Patent document 1] Japanese Patent Application Laid-Open No. 2009-212920

Non-Patent Document

[Non-patent document 1] D. Gurney, G. Buchwald, L. Ecklund, S. Kuffner, and J. Grosspietsch, "Geo-location database techniques for incumbent protection in the TV white space," Proc. IEEE International Symposium on New Frontiers in Dynamic Spectrum Access Network (DyS-PAN), October 2008.

[Non-patent document 2] Hironori Shiba, Munehiro Matsui, Kazunori Akabane, and Kazuhiro Uehara "Cognitive wireless system using technology for detecting interference with high accuracy and for avoiding the interference", Institute of Electronics, Information and Communication Engineers Technological Research Report SR2008-27 pp. 61-66, July, 2008.

SUMMARY OF INVENTION

Technical Problem

According to the non-patent document 1, in the case that the propagation model is different from an actual environment, there is a rising probability that an estimation error on the propagation loss becomes increasing. Accordingly, when permissible transmit power is determined by use of the estimated value of the propagation loss in the case that the secondary system shares the frequency, reliability on the permissible transmit power is lowered if the estimated value of the propagation loss includes large error. Therefore, it is impossible to carryout appropriate interference causing control to the secondary system.

In contrast, the wireless communication system described in the non-patent document 2 measures the decline of the throughput of the primary system in real time, and issues the interference alert to the secondary system on the basis of the measurement result. Accordingly, it is possible to carry out the appropriate interference causing control adaptively to the actual environment. However, according to the non-patent literature 2, it is necessary that a function, which is required for the interference causing control newly, is installed in the primary system in addition to an existing configuration of the primary system. The function required for the interference causing control, for example, a function to measure the decline of the throughput and a function to inform the secondary system of the alert. Meanwhile, the primary system and the secondary system may not be provided by the same operator. Accordingly, it may not be desirable in some cases to request adding the function, which is used only for using the secondary system, for the primary system.

Moreover, in the case of the patent document 1, under the assumption of the propagation model of the attenuation coefficient due to the distance, the propagation loss to the receiving device of another system is estimated. Since this is the same method as one described in the non-patent document 1, there is a possibility that an error between the propagation model and the actual environment may be large.

The present invention is conceived in order to solve at least one problem mentioned above. An object of the present invention is to provide a wireless communication apparatus, a wireless communication system, an interference causing control method, a storage medium, and a control apparatus which can carry out appropriate interference causing control adaptively to the actual environment in the secondary system with no change in the configuration of the primary system.

Solution to Problem

A wireless communication apparatus according to the present invention belongs to a wireless communication system, and measures a wireless signal which causes interference to another system and which is transmitted by another wireless communication apparatus belonging to the wireless communication system.

A wireless communication apparatus according to the present invention controls own transmitting on the basis of a measurement result, which is measured by another wireless communication apparatus belonging to the same wireless communication system as the wireless communication apparatus belongs to, on a wireless signal which is transmitted by the wireless communication apparatus and which causes the interference to another system.

A wireless communication system according to the present invention includes a wireless communication apparatus measuring a wireless signal which is transmitted by another wireless communication apparatus belonging to the same wireless communication system as the wireless communication apparatus belongs to and which causes interference to another system.

An interference causing control method according to the present invention makes a predetermined wireless communication apparatus, which belongs to a wireless communication system, measure a wireless signal which is transmitted by another wireless communication apparatus belonging to the wireless communication system and which causes interference to another system.

An interference causing control method according to the present invention makes a second wireless communication apparatus, which belongs to a wireless communication system, measure a wireless signal which is transmitted by a first wireless communication apparatus belonging to the wireless communication system and which causes interference to another system, and makes the first wireless communication apparatus carry out transmit control on the basis of the measurement result.

A storage medium according to the present invention stores an interference causing control program which makes a computer of a predetermined wireless communication apparatus of a wireless communication system carry out a process of measuring a wireless signal which is transmitted by another wireless communication apparatus of the wireless communication system and which causes interference to another system.

A control apparatus according to the present invention, which controls, at least, a wireless communication system, includes a control unit. From a second wireless communication apparatus of the wireless communication system measuring a wireless signal which is transmitted by a first wireless communication apparatus of the wireless communication system and which causes interference to another system, the control unit receives the measurement result, and creates transmit control-related information on the basis of the measurement result, and transmits the transmit control-related information to the first wireless communication apparatus.

Advantageous Effects of Invention

According to the present invention, it is possible to carry out the appropriate interference causing control in the secondary system adaptively to the actual environment with no change in the configuration of the primary system.

DESCRIPTION OF EMBODIMENTS

First Exemplary Embodiment

Figure 1:
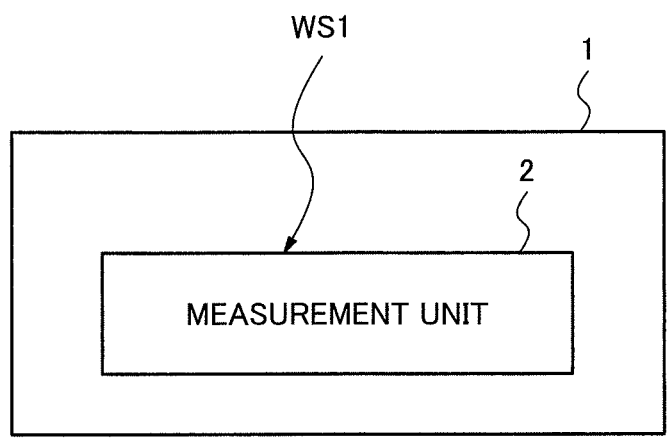
FIG. 1 is a block diagram showing an example of a configuration of a wireless communication apparatus according to a first exemplary embodiment of the present invention.

FIG. 1 is a block diagram showing an example of a configuration of a wireless communication apparatus 1 (monitoring station) according to a first exemplary embodiment of the present invention. The wireless communication apparatus 1 belongs to a secondary system (interference causing system). The wireless communication apparatus 1 includes a measurement unit 2 (measurement means) which measures (monitors) a wireless signal WS1 which is transmitted by another wireless communication apparatus (wireless communication apparatus which is included in the secondary system and is different from the wireless communication apparatus 1) of the secondary system and which causes interference to a primary system (interference receiving system).

Accordingly, the secondary system can carry out interference causing control, for example, on the basis of the measurement result. Here, the interference causing control means transmit control (for example, transmitting stopping process, transmit power varying control process or the like) for the other wireless communication apparatus mentioned above which is included in the secondary system and which is a source of the wireless signal WS1.

According to the first exemplary embodiment described above, all processes which are required for the interference causing control can be terminated within the secondary system. Accordingly, it is possible to carry out the interference causing control in the secondary system with no influence on a configuration of the primary system differently from the art described in the non-patent document 2.

Furthermore, according to the first exemplary embodiment described above, for example, the wireless communication apparatus 1, which is located around a receiving station (closely to the receiving station) existing in a service area of the primary system, can measure the wireless signal, which is transmitted by the other wireless communication apparatus mentioned above, as a substitution of the receiving station. Accordingly, it is possible to carry out the appropriate interference causing control more adaptively to the actual environment in comparison with the composition of estimating the transmit power on the basis of the propagation model which is described in the non-patent document 1.

In summary, according to the first exemplary embodiment, it is possible to carry out the appropriate interference causing control in the secondary system adaptively to the actual environment with no change in the configuration of the primary system.

Here, it is possible that, for example, a base station, a relay station or a terminal station has functions of the wireless communication apparatus 1, or it may be preferable that a station dedicated to the monitoring (monitoring node) has the functions of the wireless communication apparatus 1.

Second Exemplary Embodiment

Hereinafter, a wireless communication system according to a second exemplary embodiment of the present invention will be described with reference to drawings.

Figure 2:
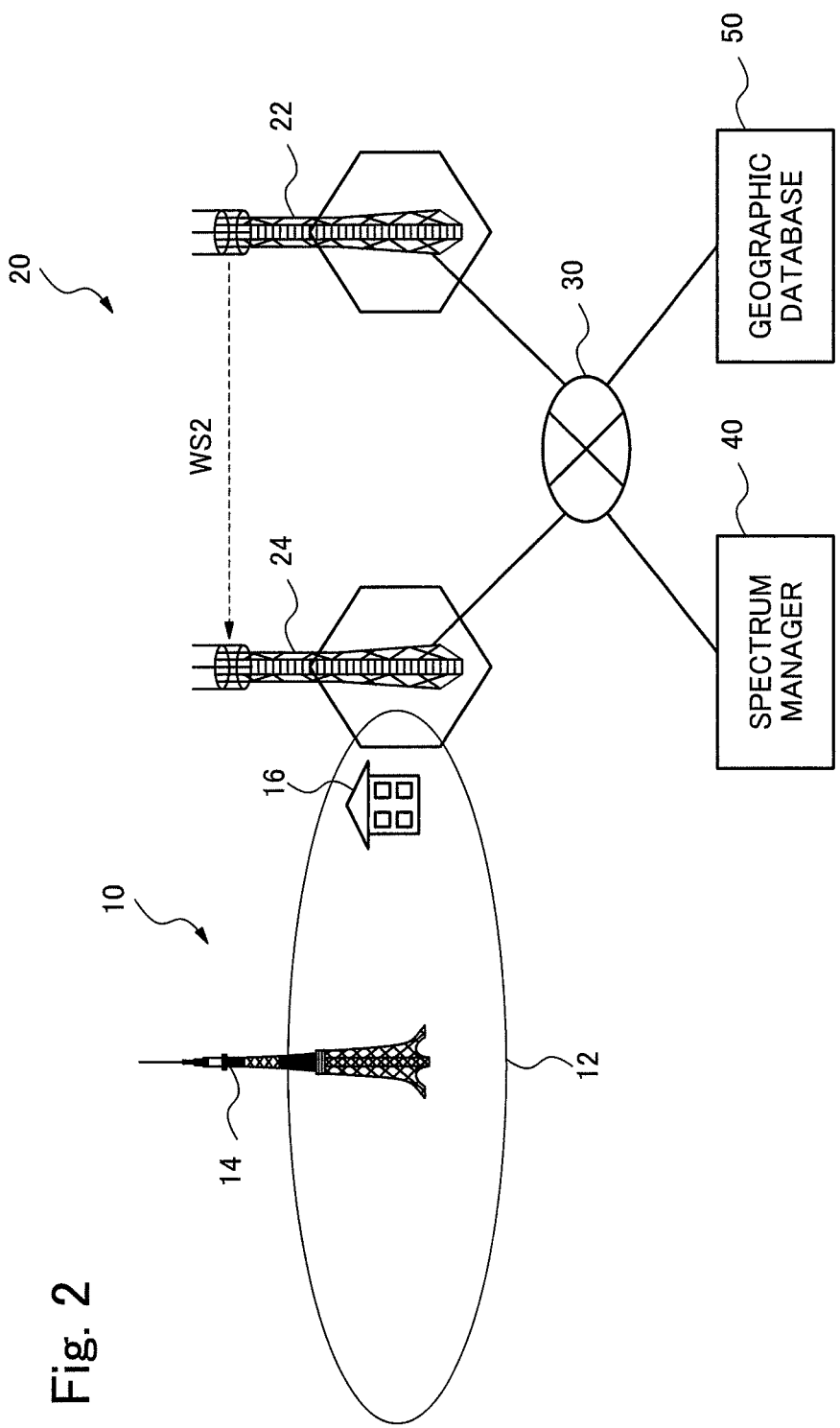
FIG. 2 is a system configuration diagram showing an example of a configuration of a wireless communication system according to a second exemplary embodiment of the present invention.

FIG. 2 is a system configuration diagram showing an example of a configuration of the wireless communication system according to the second exemplary embodiment of the present invention. The wireless communication system includes a primary system 10 and a secondary system 20 which shares a frequency bandwidth assigned originally to the primary system. Hereinafter, a case that the primary system 10 is a TV broadcasting system and the secondary system is a cellular system is exemplified. It is needless to say that the above case is a mere example. A combination of the primary system 10 and the secondary system 20 is not limited to a combination of the TV broadcasting system and the cellular system. It is possible that a combination of the TV system and a WRAN system, or a combination of the TV system and a regional wireless system or a disaster prevention wireless system of the local government is applied to a combination of the primary system 10 and the secondary system 20. Furthermore, it may be preferable that a combination of the cellular system and a special purpose wireless system (for example, condominium wireless system, corporate wireless system, farmer's wireless system or the like), or a combination of the cellular system and a wireless LAN or a short distance wireless communication or the like is applied to a combination of the primary system 10 and the secondary system 20. Here, LAN is an abbreviation of Local Area Network.

The primary system 10 includes a broadcasting station 14 (primary transmitting station) which has a service area 12, and a receiving station 16 (primary receiving station) which receives a TV broadcast signal in the service area 12.

The secondary system 20 includes, at least, a first base station 22 (an example of "interference causing station") and a second base station 24 (an example of "monitoring station").

The first base station 22 has, at least, a function to transmit a wireless signal ("wireless signal transmitting function") which exists in a frequency bandwidth assigned to the primary system 10, and a function to carry out transmit control ("transmit control function") on the basis of a measurement result (monitoring result) which the second base station 24 measures.

The second base station 24 has, at least, a function to measure a wireless signal WS2 ("monitoring function") which is transmitted by the secondary system 20 (that is, wireless signal transmitted by the first base station 22) and which causes interference to the primary system 10. Here, the second base station 24, which is corresponding to an example of the monitoring station, measures only the wireless signal (for example, WS2) which is transmitted by the first base station 22 (that is, the other wireless communication apparatus of the secondary system 20), and does not measure the wireless signal which the second base station 24 transmits. It is also possible that the second base station 24 has furthermore a function to notify ("notification function") measurement-related information (in this case, measurement result, comparison result with a predetermined threshold value, transmit power of the first base station 22 which is calculated on the basis of the measurement result, or the like).

Here, the second base station 24 is, for example, a predetermined base station located around a receiving station (for example, closely to the receiving station) which exists in the service area 12 of the primary system 10 such as the receiving station 16.

The secondary systems 20 are connected furthermore with a spectrum manager 40 and a geo-location database 50. Here, the spectrum manager 40, the geo-location database 50, the first base station 22 and the second base station 24 are connected each other via a predetermined network 30 (wired network is exemplified). It is needless to say that the network 30 is not limited to the wired network, and it may be preferable that other network (for example, wireless network) is used as the network 30.

A relation among the spectrum manager 40, the geo-location database 50 and the secondary system 20 is not limited to the above mention. For example, it may be preferable that at least one of the spectrum manager 40 and the geo-location database 50 is installed, for example, in a predetermined base station (for example, base station of the secondary system 20). Moreover, it may be preferable that at least one of the spectrum manager 40 and the geo-location database 50 belongs to a high-level system which integrates the primary system 10 and the secondary system 20.

Basically, the spectrum manager 40 manages, at least, a frequency of the secondary system 20. Furthermore, the spectrum manager 40 mediates communication, which is related to interference causing control, between the interference causing station (first base station 22 in FIG. 1) and the monitoring station (second base station 24 in FIG. 1). Specifically, the spectrum manager 40 transmits, for example, "monitoring request", which is received from the first base station 22, to the second base station 24. Moreover, the spectrum manager 40 transmits "monitoring result, judgment result, transmitting output value (for example, determined transmit power, and transmit power increasing and decreasing information) or the like", which is received from the second base station 24, to the first base station 22.

The geo-location database 50 stores, at least, predetermined information (information on a location of the wireless communication apparatus, a height of an antenna, directivity of the antenna or the like) on the wireless communication apparatus (for example, receiving station 16 in FIG. 2) of the primary system 10. The geo-location database 50 provides the request source station (for example, first base station 22) with the predetermined information in response to necessity.

Figure 3:
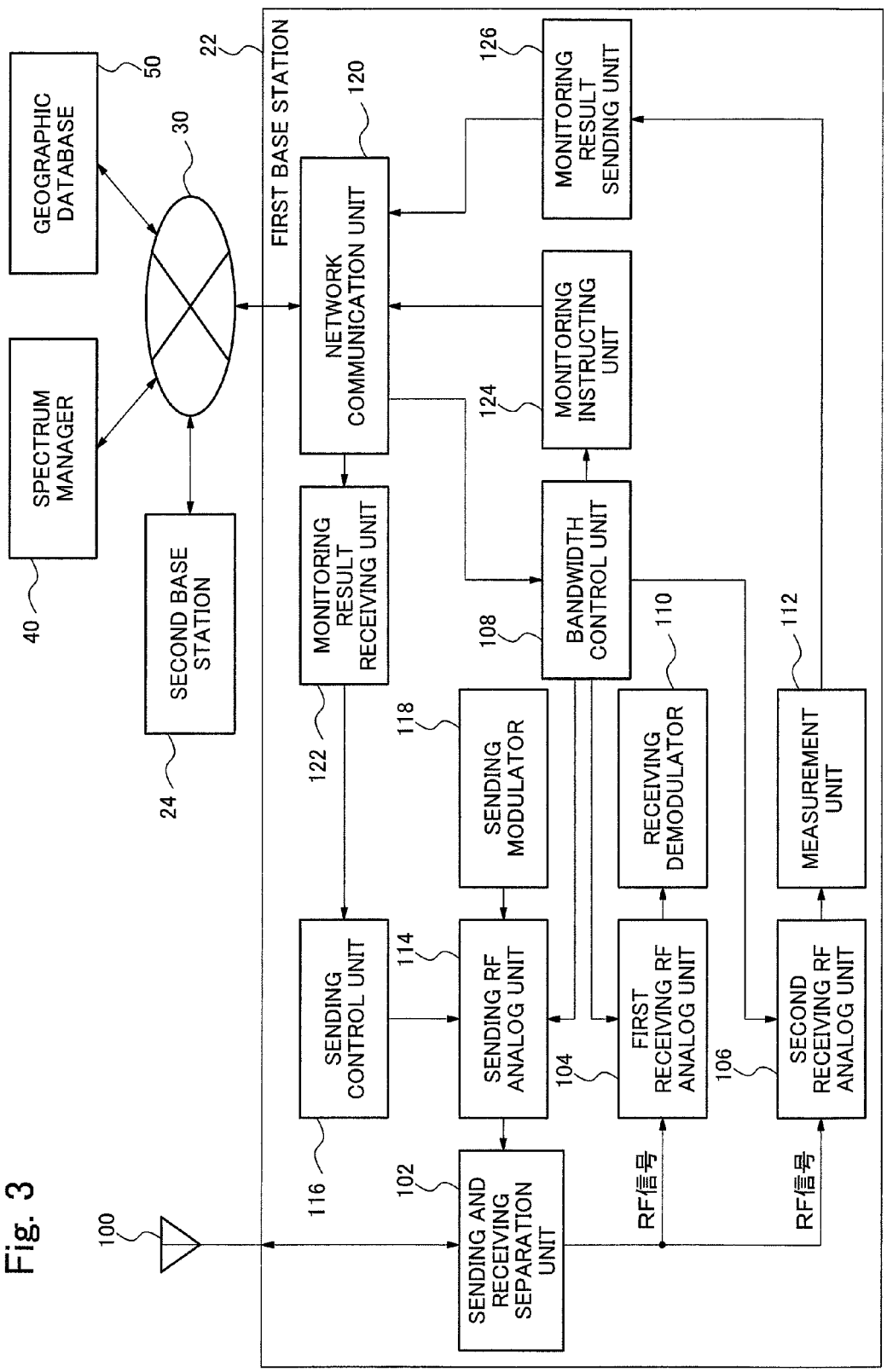
FIG. 3 is a block diagram showing an example of a configuration of an interference causing station (first base station) and a monitoring station (second base station) which are included in a secondary system shown in FIG. 2.

FIG. 3 is a block diagram showing an example of a configuration of the first base station 22 (interference causing station) and the second base station 24 (monitoring station) which are included in the secondary system 20. Here, it is preferable that the first base station 22 originally has, at least, "wireless signal transmitting function" and "transmit control function" mentioned above, and meanwhile, the second base station 24 originally has, at least, "monitoring function" mentioned above. That is, it is not always necessary that one base station out of the first base station 22 and the second base station 24 has the function which the other base station has. In order to make description clear, it is assumed hereinafter that the first base station 22 and the second base station 24 has the common configuration each other (that is, it is assumed that each base station has all functions which the first base station 22 and the second base station 24 have), and the description will be provided under the assumption.

The first base station 22 (also, second base station 24) includes an antenna 100, a transmitting and receiving separation unit 102, a first receiving RF (Radio Frequency) analog unit 104, a second receiving RF analog unit 106, and a bandwidth control unit 108. The first base station 22 (also, second base station 24) includes a receiving demodulator 110, a measurement unit 112 (measurement means), a transmitting RF analog unit 114, a transmit control unit 116 (transmit control means) and a transmitting modulator 118. Moreover, the first base station 22 (also, second base station 24) includes a network communication unit 120, a monitoring result receiving unit 122, a monitoring instructing unit 124 and a monitoring result transmitting unit 126.

The antenna 100 transmits and receives a RF signal (some stations carry out only one out of the transmitting and the receiving) with another wireless station (another base station, terminal station, relay station, monitoring node or the like). The transmitting and receiving separation unit 102 provides the antenna 100 with the RF signal, which is inputted from the transmitting RF analog unit 114, at a time when transmitting the wireless signal. The transmitting and receiving separation unit 102 provides the first receiving RF analog unit 104 and the second receiving RF analog unit 106 with the RF signal, which the antenna 100 receives, at a time when receiving the wireless signal.

The transmitting RF analog unit 114 inputs a digital signal from the transmitting modulator 118. A digital-to-analog conversion part (not shown in the figure) of the transmitting RF analog unit 114 converts the inputted digital signal into an analog signal. A frequency conversion part (not shown in the figure) of the transmitting RF analog unit 114 converts a frequency of the analog signal into a frequency which is determined by the bandwidth control unit 108. A bandwidth limiting filter (not shown in the figure) of the transmitting RF analog unit 114 removes a signal which exists outside the desired frequency bandwidth. An amplification part (not shown in the figure) of the transmitting RF analog unit 114 amplifies a signal so that transmit power may be in a permissible range.

The first receiving RF analog unit 104 and the second receiving RF analog unit 106 input the RF analog signal from the transmitting and receiving separation unit 102, and output digital baseband signals to the receiving demodulator 110 and the measurement unit 112 respectively. Here, it is not always necessary that the output of the second receiving RF analog unit 106 is the digital baseband signal. It is possible to make the measurement unit 112 input the RF analog signal as it is. In order to make the description clear, only a case that the second receiving RF analog unit 106 outputs the digital baseband signal will be described.

Specifically, a low noise amplifier (not shown in the figure) of the first receiving RF analog unit 104 (also, second receiving RF analog unit 106) amplifies the inputted RF signal firstly. Next, a band-pass filter (not shown in the figure) of the first receiving RF analog unit 104 (also, second receiving RF analog unit 106) extracts an RF signal, which is included in the desired frequency bandwidth, out of the amplified signal. A frequency conversion part (not shown in the figure) of the first receiving RF analog unit 104 (also, second receiving RF analog unit 106) converts the extracted RF signal, which is included in the desired frequency bandwidth, into a baseband signal. The baseband signal is converted from the analog signal into the digital signal by an analog-to-digital conversion part (not shown in the figure) of the first receiving RF analog unit 104 (also, second receiving RF analog unit 106).

Here, the first receiving RF analog unit 104 and the second receiving RF analog unit 106 are different each other in a point that the frequency bandwidths for extraction are different each other. That is, a frequency bandwidth of "signal which is usually received" is assigned to the band-pass filter of the first receiving RF analog unit 104. In contrast, a frequency bandwidth of "signal of monitoring target" is assigned to the band-pass filter of the second receiving RF analog unit 106. That is, the frequency bandwidth of "signal of monitoring target" means the frequency bandwidth which the secondary system shares with the primary system. In other words, the frequency bandwidth of "signal of monitoring target" means the frequency bandwidth which the interference causing station of the secondary system 20 uses for transmitting the signal.

Here, the assignment of the frequency bandwidth to the band-pass filter of the first receiving RF analog unit 104 is carried out, for example, by the bandwidth control unit 108. In this case, the bandwidth control unit 108 acquires information on the frequency bandwidth which is assigned to the band-pass filter, for example, from the spectrum manager 40 via the network communication unit 120.

The assignment of the frequency bandwidth to the band-pass filter of the first receiving RF analog unit 106 is carried out by the bandwidth control unit 108 similarly to the assignment of the frequency bandwidth to the band-pass filer of the first receiving RF analog unit 104. It may be preferable that the frequency bandwidth information together with the monitoring request is notified, for example, at a time when the interference causing station of the secondary system 20 (first base station 22 in FIG. 2) issues the monitoring request to the monitoring station of the secondary system 20 (second base station 24 in FIG. 2). In this case, the bandwidth control unit 108 of the monitoring station extracts the frequency bandwidth information out of the received monitoring request information, and assigns the frequency bandwidth to the band-pass filter of the second receiving RF analog unit 106.

It is needless to say that a method for the assignment of the bandwidth to each band-pass filter is not limited to the above-mentioned method. For example, the following method is applicable. That is, the spectrum manager 40 stores transmit frequency bandwidth information of each interference causing station in advance. When the spectrum manager 40 receives the monitoring request from a predetermined interference causing station, the spectrum manager 40 reads the transmit frequency bandwidth information on the interference causing station from a memory unit and embeds the transmit frequency bandwidth information in the monitoring request which is transmitted to the monitoring station.

The receiving demodulator 110 regenerates a bit sequence of the signals, which are received usually, through carrying out a demodulation process and a decoding process to the digital baseband signals which are received from the first receiving RF analog unit 104. A receiving processing unit (not shown in the figure) following the receiving demodulator 110 carries out a predetermined receiving process to the bit sequence signal.

The measurement unit 112 monitors an object signal (that is, signal which the interference causing station of the secondary system 20 transmits) on the basis of the digital baseband signal received from the second receiving RF analog unit 106, and transmits the monitoring result to the monitoring result transmitting unit 126. In the following description, a case that the measurement unit 112 measures "received power" of the monitoring object signal is exemplified and the case will be described in the following.

The monitoring result transmitting unit 126 transmits the received power information on the monitoring object signal, which is received from the measurement unit 112, to the interference causing station (first base station 22 in FIG. 2) of the secondary system 20 via the network communication unit 120 as the monitoring result.

The bandwidth control unit 108 assigns the predetermined frequency bandwidths to the band-pass filters of the transmitting RF analog unit 114, the first receiving RF analog unit 104, and the second receiving RF analog unit 106 respectively.

The monitoring instructing unit 124 transmits the monitoring request to the monitoring station in order to request to carry out the monitoring. The monitoring request issued by the monitoring instructing unit 124 of the interference causing station is transmitted to the monitoring station via the spectrum manager 40. Here, as mentioned above, it is possible that the interference causing station can embed the frequency bandwidth information, which is used for assigning the bandwidth to the band-pass filter of the second receiving RF analog unit of the monitoring station, in the monitoring request when the interference causing station issues the monitoring request.

The monitoring result receiving unit 122 receives the monitoring result (for example, received power) which the monitoring station transmits.

The transmit control unit 116 carries out the transmit control of the interference causing station (first base station 22 in FIG. 2) on the basis of the monitoring result. Details of the transmit control will be described in the present exemplary embodiment and the following exemplary embodiment.

Figure 4:
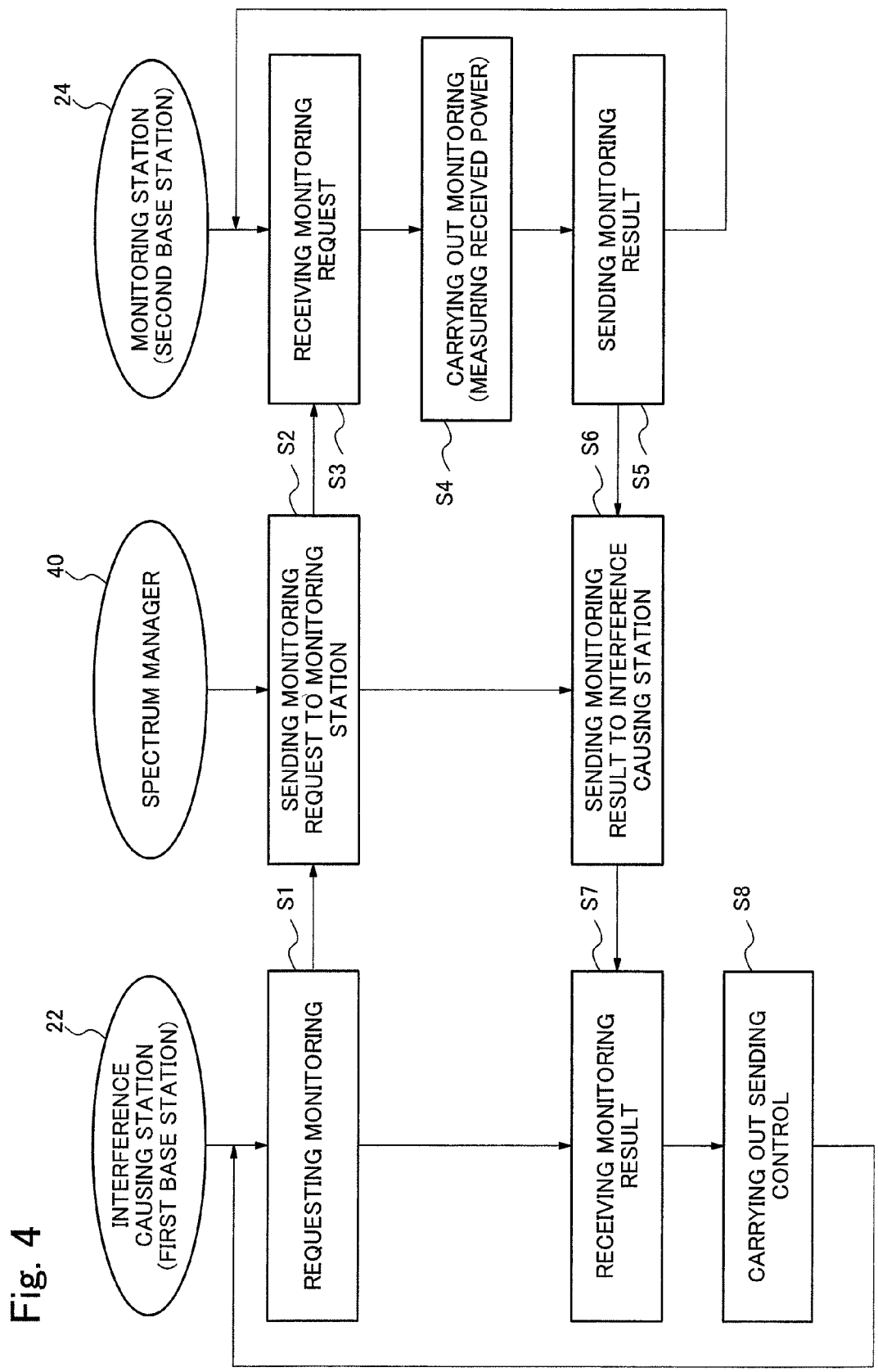
FIG. 4 is a flowchart explaining an example of an operation of the wireless communication system (an example of an operation related to a whole of interference causing control in the secondary system) shown in FIG. 2.

FIG. 4 is a flowchart explaining an example of an operation of the wireless communication system (an example of an operation related to a whole of the interference causing control in the secondary system 20) shown in FIG. 2.

The first base station 22 (interference causing station) of the secondary system 20 requests the monitoring to the second base station 24 (monitoring station) of the secondary system 20 (Step S1). Here, the monitoring request includes the frequency bandwidth information which is used for assigning the frequency bandwidth to the band-pass filter of the second receiving RF analog unit 106 of the second base station 24. That is, the above-mentioned frequency bandwidth is corresponding to the frequency bandwidth information on the frequency bandwidth which the secondary system 20 shares with the primary system 10. In other words, the above-mentioned frequency bandwidth is corresponding to the frequency bandwidth information on the signal which the first base station 22 transmits.

The spectrum manager 40 transmits the monitoring request, which is received from the first base station 22, to the second base station 24 via the network 30 (Step S2).

The second base station 24 receives the monitoring request via the spectrum manager 40 (Step S3). The second base station 24 assigns the above-mentioned frequency bandwidth information, which is included in the monitoring request, to the band-pass filter of the second receiving RF analog unit 106. Then, the second base station 24 carries out the monitoring (Step S4). Specifically, the measurement unit 112 of the second base station 24 monitors the object signal (that is, signal which the interference causing station of the secondary system 20 transmits) on the basis of the digital baseband signal which is received from the second receiving RF analog unit 106. The measurement unit 112 transmits the monitoring result to the monitoring result transmitting unit 126. Here, it is assumed that the measurement unit 112 measures "received power" of the monitoring object signal.

The monitoring result transmitting unit 126 of the second base station 24 transmits information on the received power of the monitoring object signal, which is received from the measurement unit 112, as the monitoring result (Step S5). The spectrum manager 40 transmits the monitoring result, which is received from the second base station 24, to the first base station 22 via the network 30 (Step S6).

The first base station 22 receives the monitoring result via the spectrum manager 40 (Step S7). The transmit control unit 116 of the first base station 22 carries out the transmit control on the basis of the monitoring result (Step S8).

Figure 5:
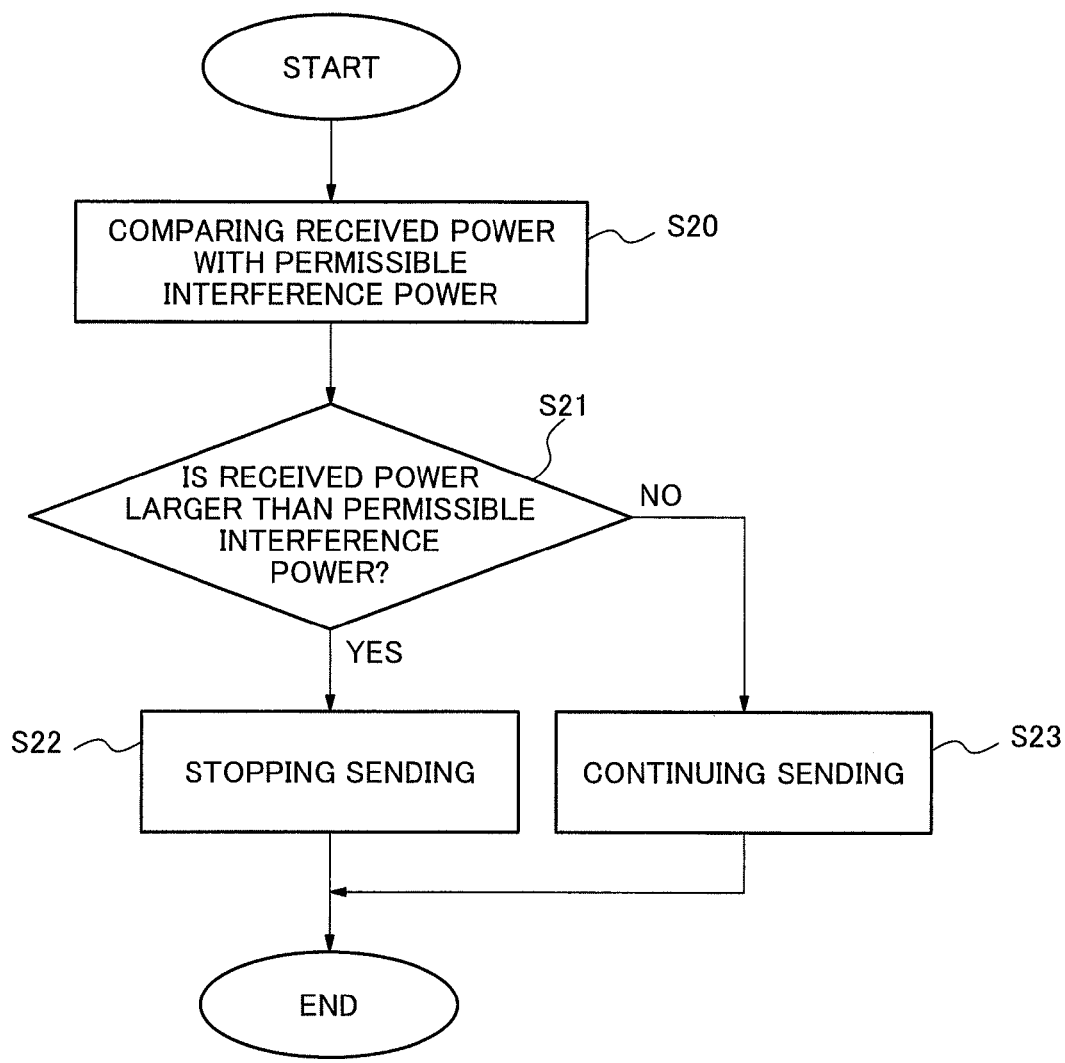
FIG. 5 is a flowchart explaining an example of transmit control which is carried out by a transmit control unit of the interference causing station (first base station) shown in FIG. 3.

FIG. 5 is a flowchart explaining an example of the transmit control which is carried out by the transmit control unit 116 of the first base station 22 (interference causing station). The transmit control unit 116 compares the received power, which is corresponding to the monitoring result, with the permissible interference power (threshold value) (Step S20). Here, it is assumed that the permissible interference power, which is corresponding to the threshold value, is stored by a predetermined storage means of the first base station 22 in advance before the comparison with the monitoring result. In the case that the transmit control unit 116 judges that the received power is larger than the permissible interference power (Yes in Step S21), the transmit control unit 116 makes the first base station 22 stop the transmitting (transmitting of the signal which shares the frequency bandwidth with the signal of the primary system 10) (Step S22). On the other hand, in the case that the transmit control unit 116 judges that the received power is not larger than the permissible interference power (No in Step S21), the transmit control unit 116 makes the first base station 22 continue the transmitting (Step S23).

According to the second exemplary embodiment described above, the interference causing control in the secondary system 20 is carried out on the basis of not information which the primary system 10 provides (for example, interference alert), but the information which the secondary system 20 measures. Here, the information, which the secondary system 20 measures, is related to the wireless signal which is transmitted by the interference causing station of the secondary system 20 and which is measured by the monitoring station of the secondary system 20. That is, differently from the art described in the non-patent document 2, it is possible to carry out the interference causing control in the secondary system with no influence on the configuration of the primary system 10.

Furthermore, according to the second exemplary embodiment described above, the monitoring station of the secondary system 20, which is located around the receiving station 16 (for example, closely to the receiving station 16) existing in the service area of the primary system, measures the power of the wireless signal, which is transmitted by the interference causing station (for example, first base station 22 in FIG. 2) of the secondary system 20, as a substitution of the receiving station 16. Accordingly, it is possible to carry out the appropriate interference causing control more adaptively to the actual environment in comparison with the composition of estimating the transmit power on the basis of the propagation model according to the description of the non-patent document 1.

In summary, according to the second exemplary embodiment, it is possible to carry out the appropriate interference causing control in the secondary system adaptively to the actual environment with no change in the configuration of the primary system.

Furthermore, according to the second exemplary embodiment described above, in the case that the received power corresponding to the result of monitoring the wireless signal, which is transmitted by the interference causing station and which causes the interference to the primary system 10, is larger than the permissible interference power, the first base station 22 stops the transmitting. Therefore, it is possible to avoid the interference to the primary system 10.

While the case that the interference causing station compares the received power with the threshold value is exemplified according to the above description, the present exemplary embodiment is not limited to the case. For example, it is also possible that the monitoring station carries out the comparison process. In this case, it is preferable that the monitoring station carries out the comparison process and transmits the comparison result (information on judgment whether larger or not larger than the threshold value, in other words, judgment whether stopping the transmitting or not) to the interference causing station. Moreover, in this case, it is also possible that the monitoring station makes its own storage means store the threshold value (permissible interference power) before carrying out the comparison process, or it is also possible that the monitoring station acquires the threshold value from the spectrum manager 40 when carrying out the comparison process.

Moreover, it is not necessary that number of the threshold values (that is, permissible interference power) is one. It is also possible to set a plurality of the threshold values. For example, in the case of setting three threshold values, it is possible to define four states (for example, increasing transmit power, maintaining current state, decreasing transmit power and stopping transmitting).

Furthermore, it is not necessary that the threshold value is fixed. It is also possible that the threshold value changes dynamically on the basis of a predetermined condition (for example, surrounding traffic or the like).

Third Exemplary Embodiment

Figure 6:
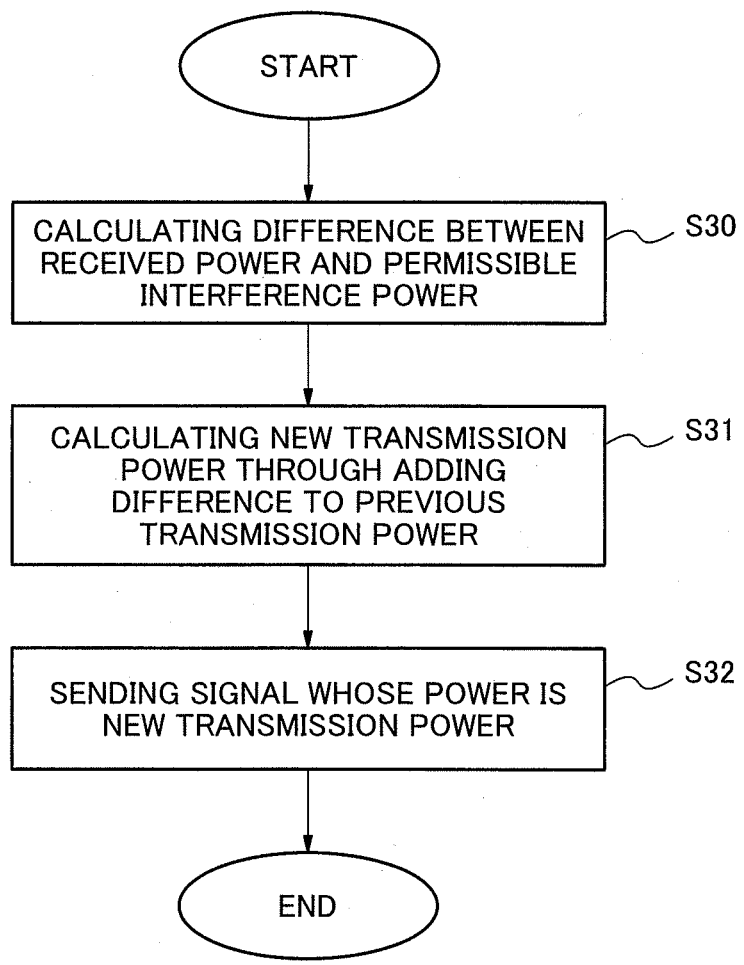
FIG. 6 is a flowchart explaining an example of transmit control, which is carried out by a transmit control unit of an interference causing station (first base station) included in a secondary system and which is different from the transmit control shown in FIG. 5, according to a third exemplary embodiment of the present invention.

FIG. 6 is a flowchart explaining an example of transmit control, which is carried out by the transmit control unit 116 of the first base station 22 (interference causing station) included in the secondary system and which is different from the transmit control shown in FIG. 5, according to a third exemplary embodiment of the present invention. A configuration of a wireless communication system, and a configuration of a first base station and a second base station, which are included in the wireless communication system, according to the present exemplary embodiment are the same as one of the wireless communication system (refer to FIG. 2) and one of the first base station 22 and the second base station 24 (refer to FIG. 3) according to the second exemplary embodiment respectively. Therefore, description on the configurations is omitted. However, since an operation of the transmit control unit 116, which is included in the first base station 22, is different from one according to the second exemplary embodiment (refer to FIG. 5), the operation of the transmit control unit 116 will be described in the following.

The transmit control unit 116 of the first base station 22 (interference causing station) calculates a difference between the received power, which is the monitoring result, and the permissible interference power (Step S30). Here, the received power is denoted as I, and the permissible interference power is denoted as Imax. Then, the difference $\Delta I$ is expressed by the following (formula 1).

$$\Delta I = I\text{max} - I [\text{dB}] \quad \text{(formula 1)}$$

The transmit control unit 116 calculates the new transmit power through adding the difference $\Delta I$ to the previous transmit power (Step S31). Here, P(n) and P(n+1) are defined as the previous transmit power and the new transmit power respectively. Then, the new transmit power P(n+1) is expressed by the following (formula 2).

$$P(n+1) = P(n) + \Delta I [\text{dBm}] \quad \text{(formula 2)}$$

The transmit control unit 116 transmits a signal whose transmit power is coincident with the new transmit power P(n+1) (Step S32).

According to the third exemplary embodiment described above, since the interference causing station adjusts the transmit power on the basis of the difference between the monitored received power and the permissible interference power, the interference causing station can transmit a signal whose transmit power is maximum with not causing the excessive interference to the primary system 10. Therefore, it is possible to provide a higher quality communication service in the secondary system 20 without causing the interference to the primary system 10.

Here, while the case that the interference causing station carries out the process of calculating the new transmit power on the basis of the difference between the received power and the permissible transmit power is exemplified according to the above mentioned description, the present invention is not limited to the case. For example, it is also possible that the monitoring station carries out the process. In this case, it is preferable that the monitoring station calculates the new transmit power by use of the above-mentioned method and transmits the calculation result to the interference causing station.

Fourth Exemplary Embodiment

Figure 7:
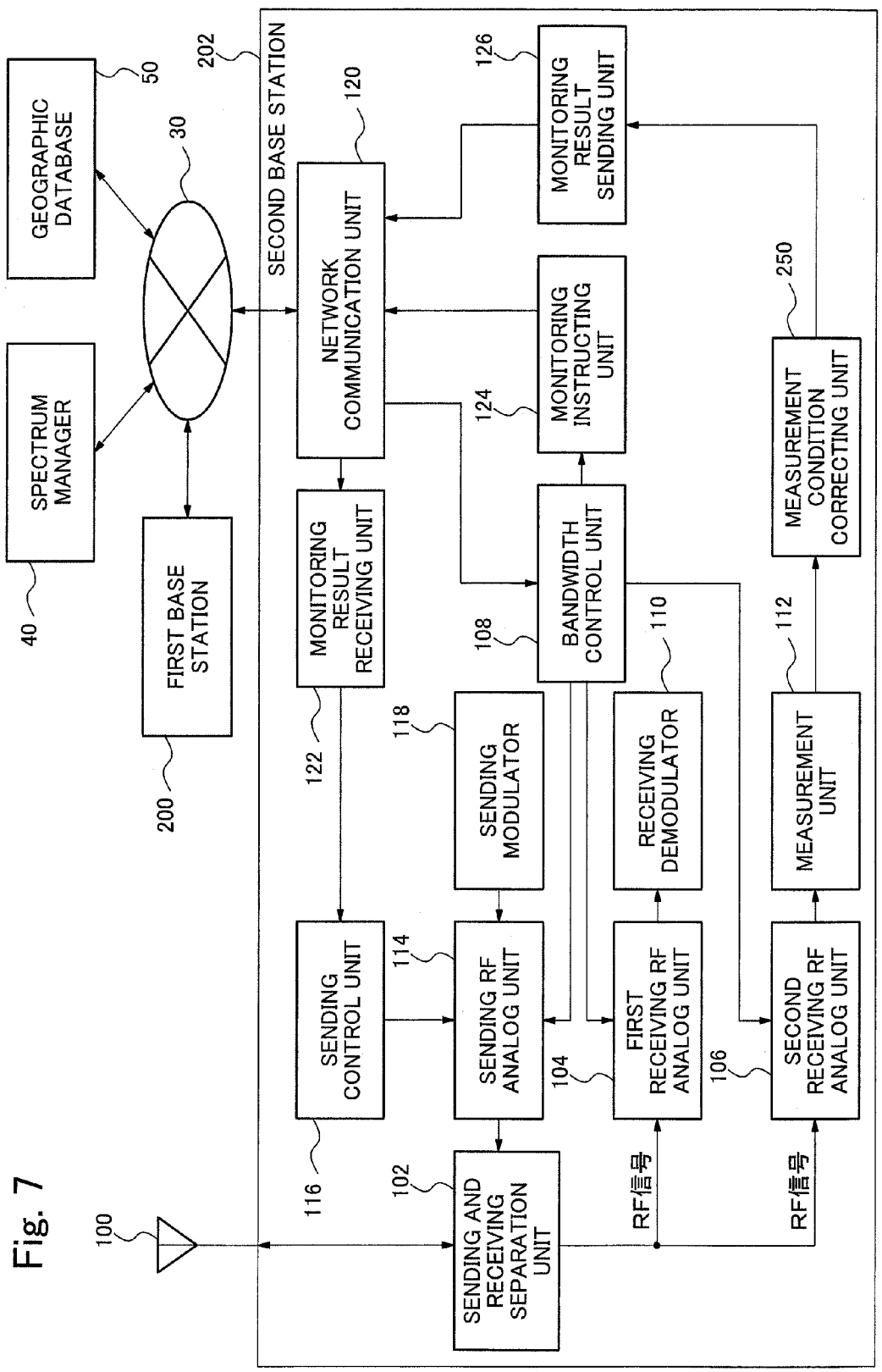
FIG. 7 is a block diagram showing an example of a configuration of an interference causing station (first base station) and a monitoring station (second base station) which are included in a secondary system of a wireless communication system according to a fourth exemplary embodiment of the present invention.

FIG. 7 is a block diagram showing an example of a configuration of a first base station 200 (interference causing station) and a second base station 202 (monitoring station) which are included in a secondary system of a wireless communication system according to a fourth exemplary embodiment of the present invention. In order to make description clear, it is assumed hereinafter that the first base station 200 and the second base station 202 have the common configuration each other (that is, it is assumed that each base station has all functions which the first base station 200 and the second base station 202 have) similarly to the second exemplary embodiment, and the description will be provided under the assumption. Accordingly, the second base station 202 will be described as a typical station in the following.

The second base station 202 (refer to FIG. 7) according to the exemplary embodiment is different from the second base station 24 (refer to FIG. 3) according to the second exemplary embodiment in a point that the second base station 202 includes a measurement condition correcting unit 250 newly. As mentioned above, since the second base station 202 has the same configuration as the second base station 24 has except for the measurement condition correcting unit 250, description on the second base station 202 except for the measurement condition correcting unit 250 is omitted.

Figure 8:
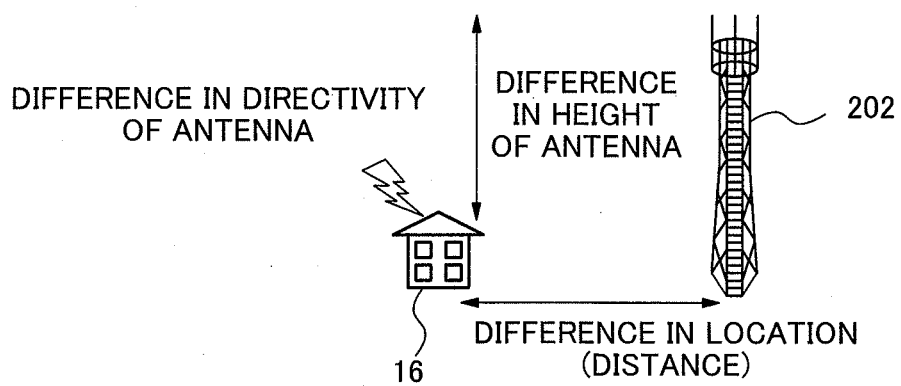
FIG. 8 shows an example of a measurement condition which is an object for correction carried out by a measurement condition correcting unit shown in FIG. 7.

Here, for example, referring to FIG. 2, the monitoring station (second base station 24) and the receiving station 16 of the primary system 10, which is caused interference actually, have the different measurement conditions each other. Then, the measurement condition correcting unit 250 of the monitoring station (second base station 202) carries out a process of correcting the difference. Specifically, the measurement condition correcting unit 250 carries out the correction process, in which the difference in the measurement condition is corrected, to the monitoring result (received power of the wireless signal which is transmitted by the interference causing station of the secondary system 20 and which causes the interference to the primary system 10) acquired from the measurement unit 112. As shown in FIG. 8, a location of each station, a height of each station and directivity of an antenna of each station are exemplified as the measurement condition in the following description. Here, the monitoring station accesses the geo-location database 50 in advance before carrying out a correction calculating process which will be shown in the following, and acquires information (information on the location, the height and the directivity of the antenna of the primary receiving station) required in the correction calculating process.

The received power before the correction, a correction component on the location, a correction component on the height, and a correction component on the directivity of the antenna are denoted as I, $\Gamma$location, $\Gamma$height, and $\Gamma$antenna, respectively. Then, the received power after the correction Ie can be calculated by use of the following (formula 3).

$$Ie = I + \Gamma location + \Gamma height + \Gamma antenna \quad \text{(formula 3)}$$

It is possible to calculate the correction component $\Gamma$location on the location and the correction component $\Gamma$height on the height by use of a predetermined propagation model in order to carry out the difference correction.

For example, in the case that the Okumura and Tie model is applied to the propagation model, propagation loss Lp [dB] is expressed by the following (formula 4).

$$Lp[dB] = 69.55 + 26.16 * \log(f) - 13.82 * \log(hb) - a(hm) + (44.9 - 6.55 * \log(hb)) * \log(d) \quad \text{(formula 4)}$$

where f is frequency [MHz] (150<f<2200), and hb is the transmitting station antenna height [m] (30<hb<200), and hm is the receiving station antenna height [m] (1<hm<10), and d is the propagation distance [km] (1<d<20). Moreover, log means a logarithm base 10. Moreover, a correction coefficient a(hm) according to the receiving station antenna height hm in (formula 4) is expressed by a formula of (1.1*log(f)−0.7)*hm−(1.56*log(f)−0.8).

Moreover, a distance between the interference causing station of the secondary system 20 and the receiving station 16 of the primary system 10 is denoted as d, and a distance between the interference causing station and the monitoring station of the secondary system 20 is denoted as d'. Then, the correction component on the location $\Gamma$location is expressed in the following (formula 5).

$$\Gamma location = (44.9 - 6.55 * \log(hb)) * \log(d'/d) \quad \text{(formula 5)}$$

Moreover, the antenna height of the receiving station 16 of the primary system 10 is denoted as hm, and the antenna height of the monitoring station of the secondary system 20 is denoted as h'm. Then, the correction component on the height $\Gamma$height is expressed in the following (formula 6).

$$\Gamma height = a(hm) - a(h'm) = (1.1 * \log(f) - 0.7) * (hm - h'm) \quad \text{(formula 6)}$$

Moreover, the correction component on the directivity of the antenna can be estimated by use of a known antenna pattern on the basis of an antenna main axis direction (direction to TV transmitter) and an incident interference direction.

For example, in the case that an antenna gain of the receiving station 16 of the primary system 10 in the incident interference direction $\theta$int is denoted as $GR(\theta int)$, and an antenna gain of the monitoring station of the secondary system 20 is denoted as $G'R(\theta int)$, the correction component on the directivity of the antenna is expressed by the following (formula 7).

$$\Gamma antenna = GR(\theta int) - G'R(\theta int) \quad \text{(formula 7)}$$

According to the fourth exemplary embodiment described above, the measurement condition correcting unit 250 corrects the difference between the measurement condition of the monitoring station and the measurement condition of the receiving station of the primary system which is affected by interference actually. Accordingly, the secondary system 20 can carry out the transmit power control on the basis of the more accurate measurement result (for example, received power).

While the case that all of three measurement conditions are corrected is exemplified according to the above-mentioned description, it is also possible to correct only one out of three conditions. Moreover, the measurement condition of the correction object is not limited to the above-mentioned measurement condition (location, height and directivity of antenna).

Moreover, while the case that the monitoring station carries out the measurement condition correcting process is exemplified according to the above-mentioned description, it is also possible that the interference causing station carries out the process. That is, in this case, it is preferable that the monitoring station transmits the monitoring result, which is monitored before the correction, to the interference causing station, and the interference causing station carries out the above-mentioned correction process to the received monitoring result which is monitored before the correction. In this case, it is preferable that the measurement condition correcting unit 250 is arranged, for example, between the monitoring result receiving unit 122 and the transmit control unit 116 in the interference causing station. Moreover, in this case, it is preferable that the interference causing station acquires information, which is required in the correction calculating process, from the geo-location database 50.

While the case that the exemplary embodiment is applied to the second exemplary embodiment is exemplified according to the above-mentioned description, it is also possible to apply the exemplary embodiment to the third exemplary embodiment, or a combination of the second exemplary embodiment and the third exemplary embodiment.

Fifth Exemplary Embodiment

Figure 9:
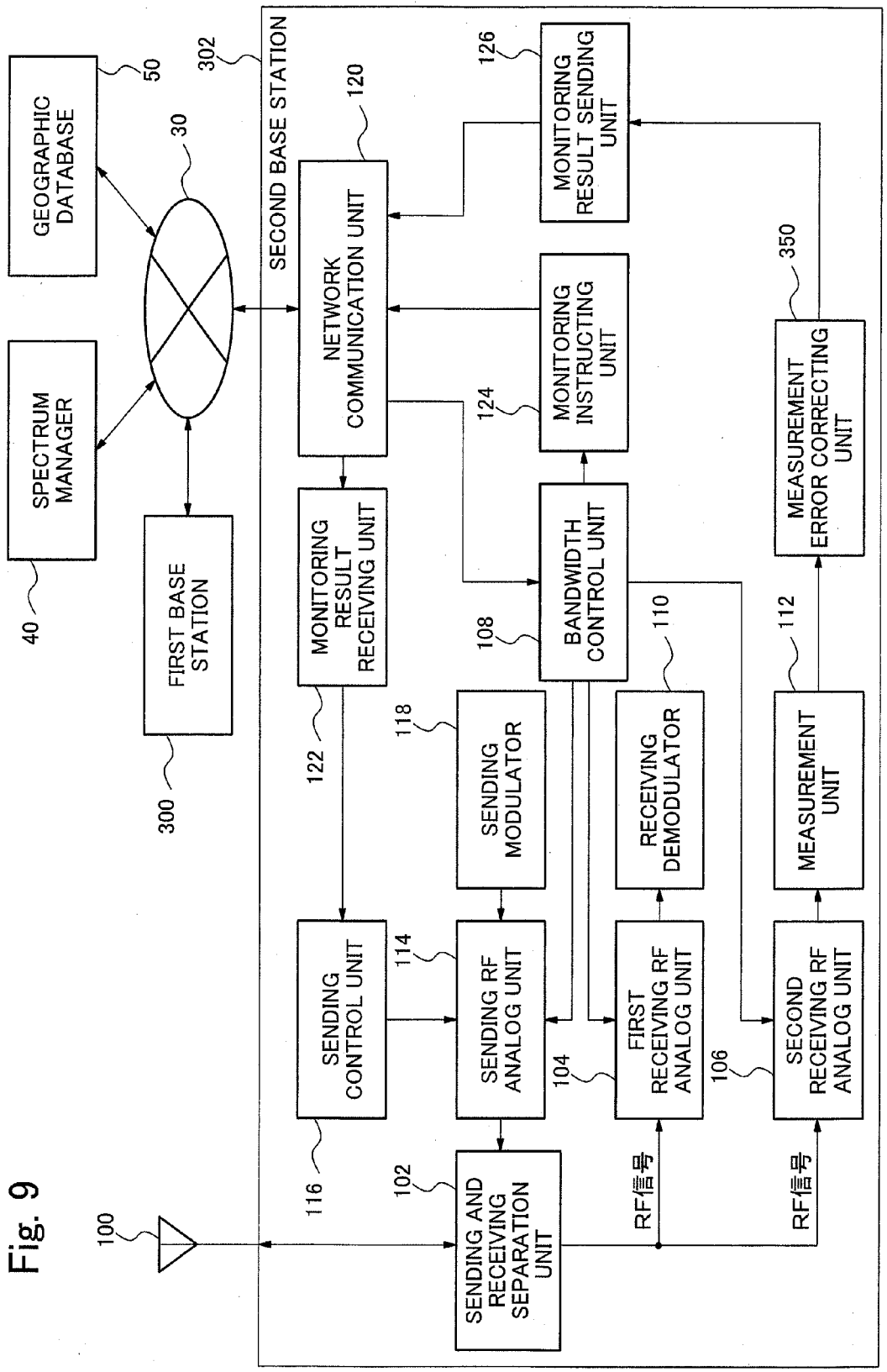
FIG. 9 is a block diagram showing an example of a configuration of an interference causing station (first base station) and a monitoring station (second base station) which are included in a secondary system of a wireless communication system according to a fifth exemplary embodiment of the present invention.

FIG. 9 is a block diagram showing an example of a configuration of a first base station 300 (interference causing station) and a monitoring station 302 (second base station) which are included in a secondary system of a wireless communication system according to a fifth exemplary embodiment of the present invention. In order to make description clear, it is assumed hereinafter that the first base station 300 and the second base station 302 have the common configuration each other (that is, it is assumed that each base station has all functions which the first base station 300 and the second base station 302 have) similarly to the second exemplary embodiment, and the description will be provided under the assumption. Accordingly, the second base station 302 will be described as a typical station in the following.

The second base station 302 (refer to FIG. 9) according to the exemplary embodiment is different from the second base station 24 (refer to FIG. 3) according to the second exemplary embodiment in a point that the second base station 302 includes a measurement error correcting unit 350 newly. Here, since the second base station 302 has the same configuration as the second base station 24 has except for the measurement error correcting unit 350 as mentioned above, description on the second base station 302 except for the measurement error correcting unit 350 is omitted.

Here, due to the thermal noise which is included in the monitoring process, and due to influence which is caused by the signal transmitted by the primary system 10, a value of the received power, which the monitoring station measures, includes not a small amount of measurement error. There is a possibility that the received power which the monitoring station measures, that is, the power of the interference, which is caused to the primary system 10, may be underestimated due to the measurement error. In this case, there is a fear that the interference causing station of the secondary system 20 transmits a signal with the transmit power which exceeds the permissible interference power of the primary system 10. Then, the measurement error correcting unit 350 of the monitoring station (second base station 302) adds a margin, which is based on the measurement error, to the received power which the monitoring station measures, and corrects the received power.

In the following description, a case that the margin, which is based on "variance (for example, standard deviation)" of the measurement error, is added to the measured received power will be exemplified in the following. It is needless to say that essence of the exemplary embodiment is to add the margin based on the measurement error, and it is not always necessary that the margin is based on the variance of the measurement error.

Figure 10:
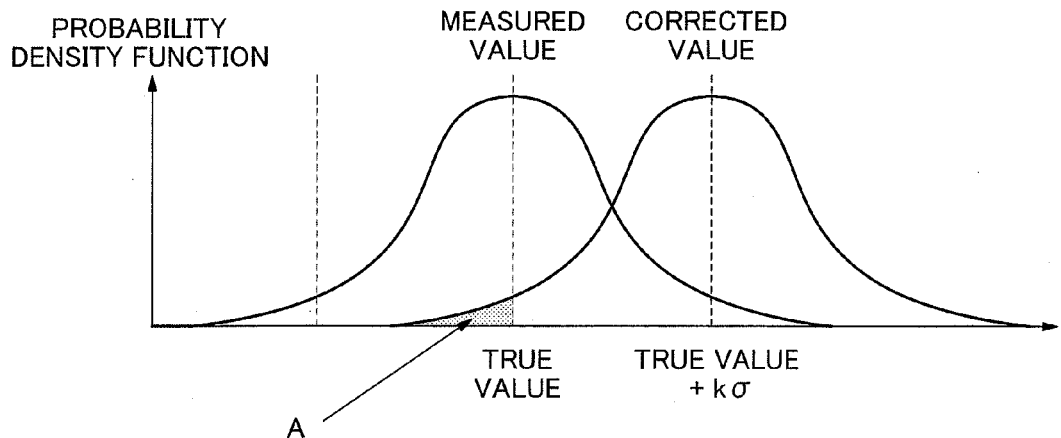
FIG. 10 is a conceptual diagram showing a measurement error related to the fifth exemplary embodiment.

FIG. 10 is a conceptual diagram showing the measurement error. Usually, a measured value may include an error whose value distributes symmetrically on both sides of a true value, and the measurement error may be approximated by the Gaussian distribution (average value is 0 and variance is $\sigma^2$) in some cases as shown in FIG. 10. Here, while it is assumed that the measurement error is based on the Gaussian distribution according to the exemplary embodiment, if the distribution of the measurement error is known in advance, it is possible to assume the distribution similarly by use of the known distribution.

The measured received power (interference causing power before the correction), a margin parameter according to the measurement error, and a variance parameter of the Gaussian distribution are denoted as I, k, and σ respectively. Then, the received power after the correction Ie is expressed by the following (formula 8).

$$Ie = I + k\sigma \quad \text{(formula 8)}$$

Here, the variance $\sigma^2$ of the Gaussian distribution is determined on the basis of a total of the thermal noise power and the received power of the signal transmitted by the primary system 10, a measurement method, and a period of time for the measurement in the monitoring station. Here, the thermal noise power and the received signal power are measured by the monitoring station in advance before the correction process is carried out, and the variance $\sigma^2$ is determined on the basis of the measurement method and the period of time for the measurement.

A value, which is changed on the basis of a degree of protection against the interference, is assigned to the margin parameter k. For example, in the case that the Gaussian distribution is assumed, it is well known that a probability that an estimated value of the interference power is smaller than a true value (that is, probability that the corrected value is smaller than the measured value (area indicated by A in FIG. 10)) is 15.8% in case of k=1, 2.4% in case of k=2, and 0.15% in case of k=3.

For example, in the case that the true value of the interference power is equal to the permissible interference power and k is assigned 2, the probability that the correction value is larger than the permissible interference power is 97.6%, and the probability that the correction value is smaller than the permissible interference power is 2.4%. That is, in the case of k=2, it is possible to decrease the transmit power (or to stop the transmitting) with the probability of 97.6%, and it is possible to reduce the probability of causing the interference, whose power exceeds the permissible interference power due to increasing the transmit power, down to 2.4%. Accordingly, it is possible to lower the probability of causing the interference whose power exceeds the permissible interference power.

According to the fifth exemplary embodiment described above, it is possible to carry out the accurate interference causing control irrespective of the measurement method, which is carried out by the monitoring station, through changing the margin of the measurement error. For example, it is possible to prevent a situation of causing the interference, whose power exceeds the permissible interference power, to the primary system 10 due to the underestimation of the measured received power (caused interference).

Here, while the margin for the measurement error is added to the measured interference causing power according to the above description, it is also possible to add another margin for a decrease of the received power, which is due to influence of the shadowing and the fading, to the interference causing power.

While the case that the present exemplary embodiment is applied to the second exemplary embodiment is exemplified according to the above description, the present exemplary embodiment is not limited to the case. It is possible to apply the exemplary embodiment to the third exemplary embodiment, the fourth exemplary embodiment, or a combination of at least two out of the second to the fourth exemplary embodiments. In the case that the exemplary embodiment is combined with the fourth exemplary embodiment (that is, includes the measurement condition correcting function), it is possible to arrange the measurement condition correcting unit and the measurement error correcting unit in series (any processing order is permitted) or in parallel. In the case of the parallel arrangement, it is possible to switch the measurement condition correcting unit and the measurement error correcting unit each other on the basis of a predetermined metric.

Here, while the case that the monitoring station carries out the measurement error correcting process is exemplified according to the above description, it is also possible that the interference causing station carries out the process. That is, in this case, it is preferable that the monitoring station transmits the monitoring result, which is monitored before the correction, to the interference causing station, and the interference causing station carries out the above-mentioned correction process to the received monitoring result which is monitored before the correction. In this case, it is preferable that the measurement error correcting unit 350 is arranged, for example, between the monitoring result receiving unit 122 and the transmit control unit 116 in the interference causing station.

Sixth Exemplary Embodiment

Figure 11:
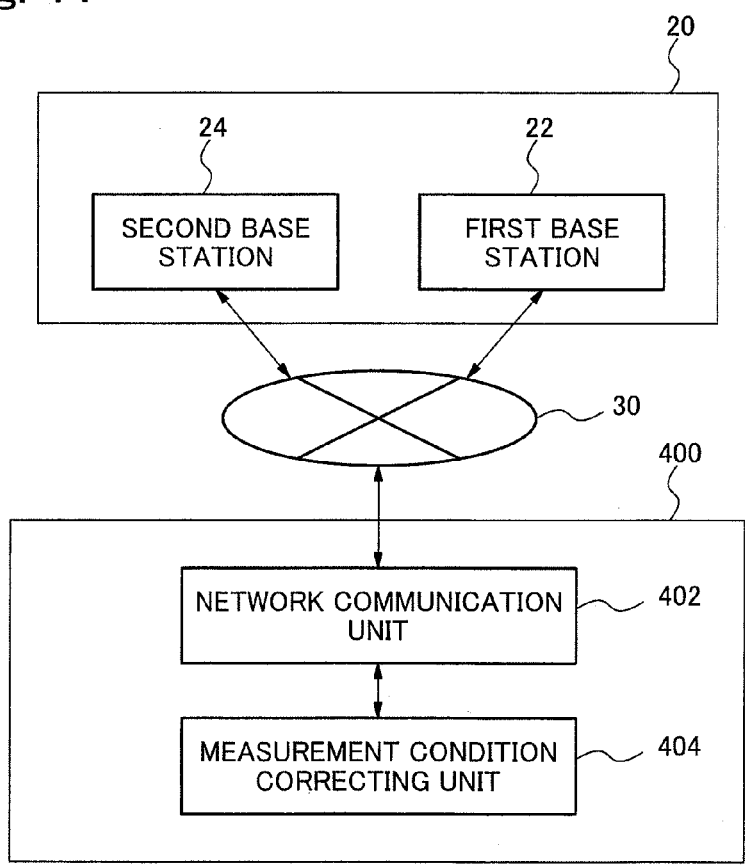
FIG. 11 is a block diagram showing an example of a configuration of a spectrum manager according to a sixth exemplary embodiment of the present invention.

FIG. 11 is a block diagram showing an example of a configuration of a spectrum manager 400 (control apparatus) according to a sixth exemplary embodiment of the present invention. The spectrum manager 40 according to the second to the fifth exemplary embodiments is the mere relay apparatus between the interference causing station and the monitoring station. However, the spectrum manager 400 according to the present exemplary embodiment has a feature of installing a part of the functions on the interference causing control which is carried out in the secondary system. Here, specifically, a part of the functions means a part of or a whole of the functions on the interference causing control except for the monitoring function. For example, a part of the functions means a function corresponding to the measurement condition correcting unit 250 (refer to FIG. 7) according to the fourth exemplary embodiment.

The spectrum manager 400 includes a network communication unit 402 and a measurement condition correcting unit 404. The network communication unit 402 communicates with the first base station 22 (interference causing station) and the second base station 24 (monitoring station), which are included in the secondary system 20, via the network 30. The measurement condition correcting unit 404 has the same function as the measurement condition correcting unit 250 according to the fourth exemplary embodiment has.

That is, the network communication unit 402 of the spectrum manager 400 receives the received power, which is monitored before the correction, from the second base station 24. Then, the network communication unit 402 does not transmit merely this value to the first base station 22, but carries out the correction by use of the measurement condition correcting unit 404. Then, the network communication unit 402 transmits the corrected received power to the first base station 22. Here, as an example of "corrected received power", it is possible to exemplify the corrected value which is obtained through correcting the difference between the measurement conditions and which is expressed in (formula 3).

According to the sixth exemplary embodiment described above, it is possible to make the configuration of the secondary system 20 simple through transferring a part of the functions on the interference causing control of the secondary system 20 to the spectrum manager 400.

Here, while the case that the measurement condition correcting unit 404 is installed in the spectrum manager 400 is exemplified according to the above description, the present exemplary embodiment is not limited to the case. For example, it is also possible to install the measurement error correcting function (function corresponding to the measurement error correcting unit 350 according to the fifth exemplary embodiment) in the spectrum manager 400 in place of or in addition to the measurement condition correcting unit 404.

In the case that the spectrum manager 400 has the measurement condition correcting function and the measurement error correcting function, it is possible to arrange the measurement condition correcting unit and the measurement error correcting unit in series (any processing order is permitted) or in parallel. In the case of the parallel arrangement, it is possible to switch the measurement condition correcting unit and the measurement error correcting unit each other on the basis of a predetermined metric.

Moreover, it is possible to install another function on the interference causing control, for example, the transmit control function (function corresponding to the transmit control unit 116 according to the second and the third exemplary embodiments) in the spectrum manager 400 in place of or in addition to each the correction function. That is, in this case, the spectrum manager 400 receives the measured received power (that is, received power which is not corrected yet) from the monitoring station, and carries out the correction (measuring condition correcting process and/or measurement error correcting process) on the basis of necessity. The spectrum manager 400 carries out final judgment on the transmit control for the interference causing station, and transmits the judgment result (that is, instruction to stop the transmitting or to continue the transmitting, or new value of the transmit power based on the difference) to the interference causing station.

Here, in the second to the sixth exemplary embodiments described above, it is also possible that the monitoring station estimates beforehand the received power of the primary system (TV signal) and the noise power before the interference causing station transmits the signal. Here, before the interference causing station transmits the signal, the received signal, which exists within the monitoring target frequency bandwidth and which the monitoring station receives, includes the TV signal and the thermal noise which is caused in the receiving device of the monitoring station. Then, the monitoring station measures the received power within the frequency bandwidth in advance. Therefore, it is also possible that the monitoring station subtracts the received power of the TV signal and the noise power, which are measured in advance, from the received power within the monitoring target frequency bandwidth, and judges that the subtraction result is the measurement result of the received power.

Moreover, in the second to the sixth exemplary embodiments described above, it is also possible to estimate the received power on the basis of another characteristic quantity instead of the direct measurement of the received power. For example, it is also possible to estimate the received power by use of a correlation value which is calculated with the sliding correlation of a pilot signal. Specifically, it is also possible that the value of the correlation between the pilot signal which is received actually, and the known pilot signal is calculated by use of the sliding correlation, and the maximum correlation value is extracted, and the received power of the pilot signal is estimated on the basis of the maximum correlation value, and furthermore the total received power (a total of the pilot signal power and the data signal power) is estimated. Here, it is possible to calculate the received power of the pilot signal through generating beforehand a table which indicates association between the maximum correlation value and the received power of the pilot signal, and searching for the received power of the pilot signal in the table by use of a search key of the extracted maximum correlation value.

Figure 12:
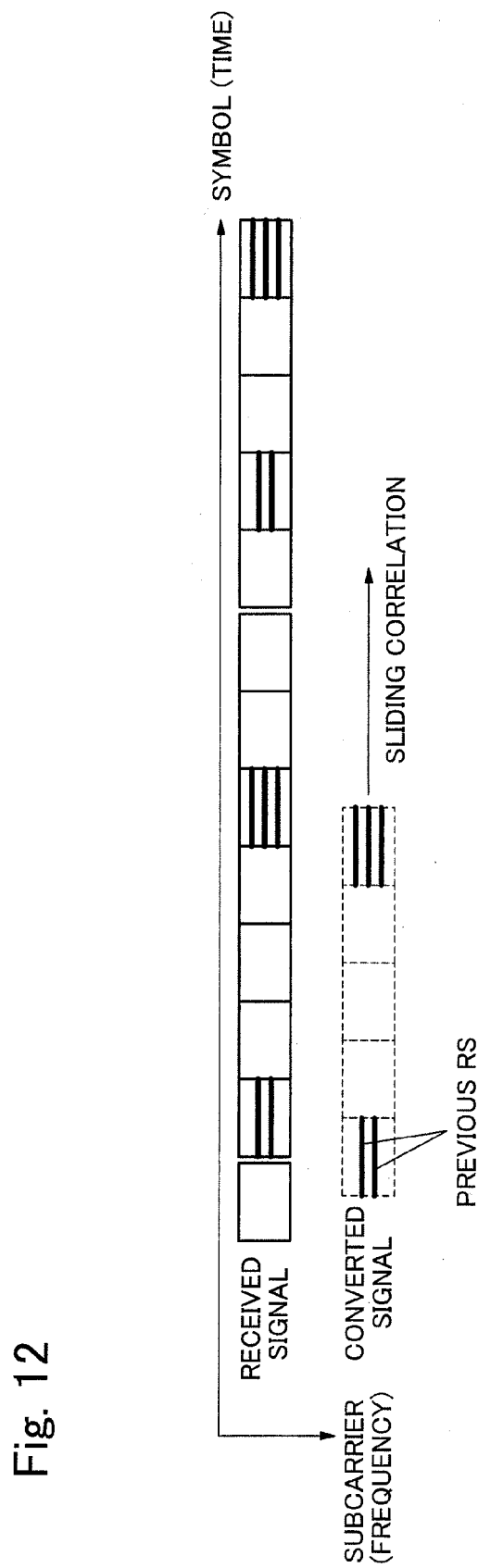
FIG. 12 is a conceptual diagram showing the sliding correlation.

FIG. 12 is a conceptual diagram showing the sliding correlation. For example, in the case that the interference causing signal is a LTE (Long Term Evolution) downlink signal, the interference causing station notifies the monitoring station, to which the interference causing station requests the monitoring, of its own cell ID (Identification) via the network 30. The monitoring station generates RS (Reference Signal which is the known pilot signal used for the channel estimation, and is associated with the cell ID) corresponding to the notified cell ID, and furthermore converts RS into a time-domain signal.

$$T_{max} = \max_{0 \leq n \leq N-1} \left| \frac{1}{K} \sum_{k=0}^{K-1} y(n+k) i_p^*(k) \right| \quad \text{(formula 9)}$$

Figure 13:
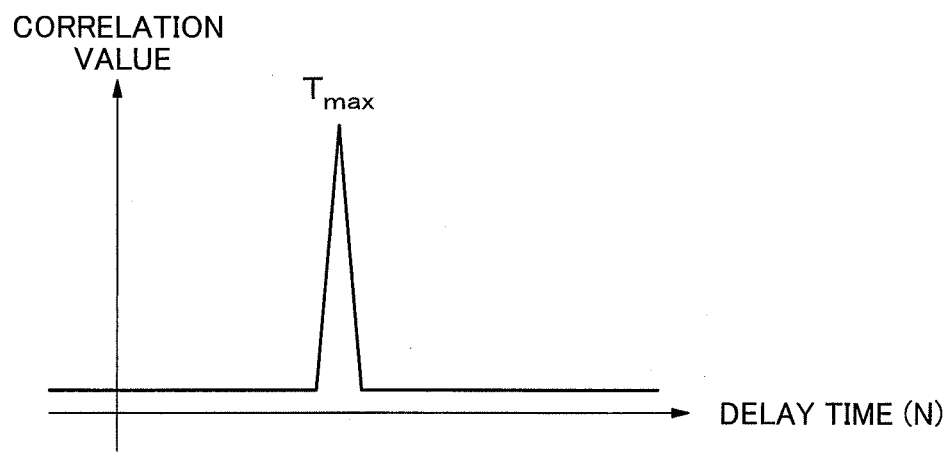
FIG. 13 is a graph showing the maximum correlation value of the sliding correlation.

By use of (formula 9), the monitoring station calculates the maximum correlation value Tmax (refer to FIG. 13) on the basis of the sliding correlation between complex conjugate ($i^*_p(k)$) of the RS signal which is converted into the time-domain signal (abbreviated as "converted signal" in FIG. 12), and the received signal (y(n+k)). Then, the monitoring station searches for the received power of the pilot signal in the table by use of the key of the maximum correlation value, and consequently extracts the received power of the pilot signal. Here, K in (formula 9) means a RS sequence length in the time domain. The monitoring station transmits the extracted received power of the pilot signal to the interference causing station. Moreover, it is possible that the interference causing station estimates the total received power (that is, interference power) of the monitoring station by use of a power ratio of the total transmit power, which includes power of the data unit, to the transmit power of the pilot signal, and the received power of the pilot signal which is transmitted by the monitoring station.

Here, in the second to the sixth exemplary embodiments described above, the interference causing station and the monitoring station which are included in the secondary system 20 are not limited to the base station. It may be preferable that the interference causing station and the monitoring station are, for example, a relay station or a terminal station. Moreover, it is also possible that the monitoring station is a monitoring node dedicated for the monitoring.

In the second to the sixth exemplary embodiments described above, to measure the wireless signal, which is transmitted through the secondary system 20 (interference causing system) and which causes the interference to the primary system (interference receiving system), does not always mean to measure the received power. It may be preferable that to measure the wireless signal means to measure another metric (physical quantity) as far as it is possible to recognize a degree of the interference to the primary system 10.

In the first to the sixth exemplary embodiments described above, it may be preferable that the primary system 10 and the secondary system 20 are based on the different RAT (Radio Access Technology), or on the same RAT. As a case of the different RAT, for example, a combination of the TV broadcasting system and the cellular system mentioned above is exemplified. As a case of the same RAT, for example, the primary system 10 is based on the macro-cell, and the secondary system 20 is based on the femto-cell which is arranged within the macro-cell.

Here, it is possible to realize the first to the sixth exemplary embodiments described above by predetermined hardware, for example, by a circuit.

Moreover, it is possible to realize the first to the sixth exemplary embodiments described above through making a computer circuit (for example, CPU (Central Processing Unit)), which is not shown in the figure, carry out the control and the operation according to the first to the sixth exemplary embodiments on the basis of a control program. In the case, the control program is stored, for example, by a storage medium inside the apparatus or the system or an external storage medium. Then, the computer circuit reads the control program to carry out the control. As the internal storage medium, for example, ROM (Read Only Memory), a hard disk or the like is exemplified. Meanwhile, as the external storage medium, for example, a removable medium, a removable disk or the like is exemplified While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2010-044349, filed on Mar. 1, 2010, the disclosure of which is incorporated herein in its entirety by reference.

REFERENCE SIGNS LIST

1 Wireless communication apparatus (monitoring station)
2 Measurement unit
10 Primary system
12 Service area
14 Broadcasting station (primary transmitting station)
16 Receiving station (primary receiving station)
20 Secondary system
22 First base station 24 Second base station
30 Network
40 Spectrum manager
50 Geo-location database
100 Antenna
102 Transmitting and receiving separation unit
104. First receiving RF analog unit
106 Second receiving RF analog unit
108 Bandwidth control unit
110 Receiving demodulator
112 Measurement unit
114 Transmitting RF analog unit
116 Transmit control unit
118 Transmitting modulator
120 Network communication unit
122 Monitoring result receiving unit
124 Monitoring instructing unit
126 Monitoring result transmitting unit
200 First base station
202 Second base station
250 Measurement condition correcting unit
300 First base station
302 Second base station
350 Measurement error correcting unit
400 Spectrum manager
402 Network communication unit
404 Measurement condition correcting unit

The invention claimed is:

1. A wireless communication apparatus, wherein the wireless communication apparatus belongs to a first wireless communication system, and measures a wireless signal which causes interference to a second wireless communication system, wherein the wireless signal is transmitted by another wireless communication apparatus belonging to the first wireless communication system,
wherein the first wireless communication system is different from the second wireless communication system,
wherein the other wireless communication apparatus carries out transmit control on the basis of a corrected measurement result which is obtained through carrying out a predetermined correction process to a measurement result obtained by measuring the wireless signal, and
wherein the correction process comprises a process of correcting a difference between a measurement condition of a receiving station of the second wireless communication system and a measurement condition of the wireless communication apparatus.

2. The wireless communication apparatus according to claim 1, wherein the transmit control is carried out on the basis of a result of comparing the corrected measurement result with a predetermined threshold value.

3. The wireless communication apparatus according to claim 2, wherein the transmit control comprises a process of stopping to transmit a signal on the basis of the result of comparing the corrected measurement result with the threshold value.

4. The wireless communication apparatus according to claim 2, wherein the transmit control comprises a process in which a transmit power of the other wireless communication apparatus is adjusted so as to be coincident with a transmit power based on a difference between the corrected measurement result and the threshold value.

5. The wireless communication apparatus according to claim 2, wherein the wireless communication apparatus carries out the process of comparing the corrected measurement result with the threshold value, and the comparison result is transmitted to the other wireless communication apparatus.

6. The wireless communication apparatus according to claim 2, wherein the corrected measurement result is transmitted to the other wireless communication apparatus from the wireless communication apparatus, and the comparison process is carried out by the other wireless communication apparatus.

7. The wireless communication apparatus according to claim 1, wherein the difference between the measurement conditions is at least one out of a difference in a location, a difference in a height and a difference in directivity of an antenna between the receiving station and the wireless communication apparatus.

8. The wireless communication apparatus according to claim 7, wherein each of correction values for correcting the difference in the location and the difference in the height is calculated by use of a predetermined propagation model.

9. The wireless communication apparatus according to claim 7, wherein correction value for correcting the difference in the directivity of the antenna is calculated by use of gain of an antenna which is in an incident direction of the wireless signal in a known antenna pattern.

10. The wireless communication apparatus according to claim 1, wherein the correction process comprises a process of adding a margin, which is based on a measurement error, to the measurement result.

11. The wireless communication apparatus according to claim 10, wherein the margin is based on the variance of the measurement error.

12. The wireless communication apparatus according to claim 1, wherein to measure the wireless signal in the wireless communication apparatus is to measure received power of the wireless signal.

13. The wireless communication apparatus according to claim 1, wherein to measure the wireless signal in the wireless communication apparatus is to measure a pilot signal transmitted by the other wireless communication apparatus which transmits the wireless signal.

14. The wireless communication apparatus according to claim 13, wherein the wireless communication apparatus calculates a correlation between a pilot signal and a received signal which are acquired in advance and which are transmitted by the interference causing station, and estimates the received power of the pilot signal, which is transmitted by the interference causing station, on the basis of the peak correlation value, and furthermore estimates the received power of a whole of signals transmitted by the interference causing station.

15. A wireless communication apparatus, wherein the wireless communication apparatus controls its own transmitting on the basis of a corrected measurement result obtained through another wireless communication apparatus which belongs to a first wireless communication system to which the wireless communication apparatus belongs, wherein the other wireless communication apparatus measures a wireless signal which causes interference to a second wireless communication system, wherein the wireless communication apparatus transmits the wireless signal,
wherein the first wireless communication system is different from the second wireless communication system,
wherein the corrected measurement result is obtained through carrying out a predetermined correction process to a measurement result obtained by measuring the wireless signal, and
wherein the correction process comprises a process of correcting a difference between a measurement condition of a receiving station of the second wireless communication system and a measurement condition of the other wireless communication apparatus.

16. A wireless communication system, comprising:
a wireless communication apparatus measuring a wireless signal which causes interference to a second wireless communication system; and
another wireless communication apparatus belonging to the wireless communication system, wherein the other wireless communication apparatus transmits the wireless signal,
wherein the wireless communication system is different from the second wireless communication system,
wherein the other wireless communication apparatus carries out transmit control on the basis of a corrected measurement result which is obtained through carrying out a predetermined correction process to a measurement result obtained by measuring the wireless signal, and
wherein the correction process comprises a process of correcting a difference between a measurement condition of a receiving station of the second wireless communication system and a measurement condition of the wireless communication apparatus.

17. An interference causing control method, comprising:
making a predetermined wireless communication apparatus of a first wireless communication system measure a wireless signal which causes interference to a second wireless communication system;
making another wireless communication apparatus of the first wireless communication system carry out transmit control on the basis of a corrected measurement result which is obtained through carrying out a predetermined correction process to a measurement result obtained by measuring the wireless signal,
wherein the other wireless communication apparatus transmits the wireless signal,
wherein the first wireless communication system is different from the second wireless communication system, and
wherein the correction process comprises a process of correcting a difference between a measurement condition of a receiving station of the second wireless communication system and a measurement condition of the predetermined wireless communication apparatus.

18. An interference causing control method, comprising:
making a second wireless communication apparatus of a wireless communication system measure a wireless signal which a first wireless communication apparatus of the wireless communication system transmits, wherein the wireless signal causes interference to a second communication system; and
making the first wireless communication apparatus carry out transmit control on the basis of a corrected measurement result which is obtained through carrying out a predetermined correction process to a measurement result obtained by on measuring the wireless signal,
wherein the correction process comprises a process of correcting a difference between a measurement condition of a receiving station of the second wireless communication system and a measurement condition of the second wireless communication apparatus.

19. A non-transitory computer readable medium embodying instructions for controlling a computer of a predetermined wireless communication apparatus of a first wireless communication system to execute a process of measuring a wireless signal which causes interference to a second wireless communication system, wherein another wireless communication apparatus of the first wireless communication system transmits the wireless signal,
wherein the first wireless communication system is different from the second wireless communication system,
wherein the other wireless communication apparatus carries out transmit control on the basis of a corrected measurement result which is obtained through executing a predetermined correction process to a measurement result obtained by measuring the wireless signal, and
wherein the correction process comprises a process of correcting a difference between a measurement condition of a receiving station of the second wireless communication system and a measurement condition of the predetermined wireless communication apparatus.

20. A control apparatus which controls, at least, a wireless communication system, the control apparatus comprising:
a control unit which receives a measurement result from a second wireless communication apparatus of the wireless communication system measuring a wireless signal transmitted by a first wireless communication apparatus of the wireless communication system, wherein the wireless signal causes interference to a second wireless communication system,
wherein the control unit creates transmit control-related information on the basis of corrected information which is obtained through carrying out a predetermined correction to the measurement result, and transmits the transmit control-related information to the first wireless communication apparatus,
wherein the wireless communication system is different from the second wireless communication system, and
wherein the predetermined correction comprises a process of correcting a difference between a measurement condition of a receiving station of the second wireless communication system and a measurement condition of the second wireless communication apparatus.

21. The control apparatus according to claim 20, wherein the transmit control-related information includes, at least, transmitting instructing information based on the corrected information.

* * * * *